United States Patent

Grass et al.

(10) Patent No.: US 8,009,885 B2
(45) Date of Patent: Aug. 30, 2011

(54) IMAGE PROCESSING DEVICE AND METHOD FOR BLOOD FLOW IMAGING

(75) Inventors: Michael Grass, Buchholz In der Nordheide (DE); Holger Schmitt, Los Angeles, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 974 days.

(21) Appl. No.: 11/910,477

(22) PCT Filed: Apr. 3, 2006

(86) PCT No.: PCT/IB2006/051004
§ 371 (c)(1),
(2), (4) Date: Oct. 2, 2007

(87) PCT Pub. No.: WO2006/106470
PCT Pub. Date: Oct. 12, 2006

(65) Prior Publication Data
US 2008/0192997 A1    Aug. 14, 2008

(30) Foreign Application Priority Data
Apr. 7, 2005 (EP) .................................. 05102736

(51) Int. Cl.
*G06K 9/00* (2006.01)
*A61B 5/05* (2006.01)

(52) U.S. Cl. ..................... 382/128; 382/154; 600/420

(58) Field of Classification Search .................. 382/128, 382/129, 130, 131, 132, 133, 134, 154, 168, 382/173, 181, 203, 214, 232, 254, 256, 274, 382/276, 285, 305, 312; 600/154, 407, 420, 600/473; 378/21; 604/154
See application file for complete search history.

(56) References Cited

U.S. PATENT DOCUMENTS

| | | | | |
|---|---|---|---|---|
| 4,430,079 | A | * | 2/1984 | Thill et al. ..................... 604/154 |
| 6,754,521 | B2 | * | 6/2004 | Prince ............................. 600/420 |
| 7,558,618 | B1 | * | 7/2009 | Williams ....................... 600/473 |
| 7,680,527 | B2 | * | 3/2010 | Prince ............................. 600/420 |
| 7,689,267 | B2 | * | 3/2010 | Prince ............................. 600/420 |
| 7,693,563 | B2 | * | 4/2010 | Suresh et al. ................. 600/407 |

FOREIGN PATENT DOCUMENTS
WO    02056260    *    7/2002
(Continued)

OTHER PUBLICATIONS

H. Schmitt et al; "An X-Ray-Based Method" IEEE Transactions on Medical Imaging. vol. 21, No. 3, Mar. 2002.

(Continued)

*Primary Examiner* — Seyed Azarian (57) ABSTRACT

An image processing device is proposed and includes a reconstruction unit (51) for reconstruction of a 3D volume image of said object from said first series of X-ray projection images (D), a segmentation unit (52) for segmentation of the vessel tree from said 3D volume image, a forward projection unit (54) for forward projection of the segmented vessel tree onto said first and projection plane ($R_1$, $R_2$), respectively, and a mapping unit (55) for mapping of the image values of pixels of the vessel tree in said second and third, respectively, series of X-ray projection images onto corresponding voxels of said 3D volume image to obtain said time series of 3D volume images showing the blood flow in the vascular tree of the object.

12 Claims, 5 Drawing Sheets

FOREIGN PATENT DOCUMENTS

WO 02056260 A1 7/2002

OTHER PUBLICATIONS

H. Schmitt et al; "Image Stacking". Department of Neuroradiology, University of Heidelberg, Oct. 2002.

M. Grass et al; "Improved Flow Reconstruction", Philips Research Laboratories.

Damon Liu et al; "Large Scale Flow", Computer Science Department, University of California, Los Angeles.

Erick H. W. Meijering et al.; "Reduction of Patient Motion", Image Science Institute, University Medical Center Utrecht, Mar. 2000.

Daren A Lee et al; "Simulation and Virtual Reality", Department of Computer Sciences and Radiological Sciences, University of California, Los Angeles.

Michael H. Buonocore; "Visualizing Blood Flow Patterns", Department of Radiology, UC Davis Medical Center.

* cited by examiner

IMAGE PROCESSING DEVICE AND METHOD FOR BLOOD FLOW IMAGING

The present invention relates to an image processing device and a corresponding image processing method for generating a time series of 3D volume images showing the blood flow in a vascular tree of an object, based on a first series of X-ray projection images (D) of the object acquired from different projection directions and a second and a third series of X-ray projections images of the object acquired alternately at a first or second fixed projection plane, respectively, from a first or second fixed projection direction, respectively, during inflow of contrast agent into the vascular tree of the object. Further, the present invention relates to a computer program for implementing said method on a computer. In particular, the present invention relates to an X-ray device for imaging the blood flow in a vascular tree of an object.

A method of imaging the blood flow in a vascular tree that yields additional information concerning the vascular tree is disclosed in WO 02/056260 A1. According to this method a sequence of clusters is determined from spatially coherent voxels in the three-dimensional image of the vascular tree where the sequence of said clusters corresponds to the flow direction of the blood or the contrast medium in said vascular tree. In particular, at least one cluster that is defined by the direction of the blood flow is determined as a start cluster of the vascular tree, said cluster itself acting as the starting point for the determination of at least one next cluster in the sequence and at least some of its voxels adjoining the voxels of the start cluster and of the next cluster, and for each new cluster of the sequence the subsequent cluster is determined. Thus, for applications such as the analysis of pathologies of the cerebral vascular tree additional information can be obtained that offers the user an impression of the propagation of the contrast medium or the blood flow in the vascular tree.

However, this and other current flow reconstruction methods are based on vessel structuring and are therefore limited to tubular structures with an unambiguous connection structure of the different voxel clusters along the vascular tree. Therefore, they are not applicable to the reconstruction of, for instance, aneurismal flow at the current stage. It is thus an object of the present invention to provide an image processing device and a corresponding method which allow image reconstruction of ambiguous structures in the object of interest and, in particular, the generation of 3D volume images showing the blood flow in a vascular tree of an object even if said vascular tree comprises non-tubular structures, such as aneurysms.

The object is achieved according to the present invention by an image processing device as claimed in claim 1 comprising:

a reconstruction unit for reconstruction of a 3D volume image of said object from said first series of X-ray projection images, a segmentation unit for segmentation of the vessel tree from said 3D volume image, a forward projection unit for forward projection of the segmented vessel tree onto said first and projection plane, respectively, and a mapping unit for mapping of the image values of pixels of the vessel tree in said second and third, respectively, series of X-ray projection images onto corresponding voxels of said 3D volume image to obtain said time series of 3D volume images showing the blood flow in the vascular tree of the object.

A corresponding image processing method is defined in claim 11. A computer program comprising program code means for causing a computer to perform the steps of that method when said computer program is executed on a computer is defined in claim 12, which computer program may be stored on a record carrier.

Further, the present invention also relates to an X-ray device for imaging the blood flow in a vascular tree of an object as defined in claim 9 including:

a first imaging unit having a first X-ray source and a first X-ray detector for acquisition of a first series of X-ray projection images of the object from different projection directions and for acquisition of a second series of X-ray projections images of the object from a first fixed projection direction, a second imaging unit having a second X-ray source and a second X-ray detector for acquisition of a third series of X-ray projections images of the object from a second fixed projection direction, a control unit for controlling said first and second imaging units such that said first series of X-ray projection images is acquired before or after the second and third series of X-ray projection images are acquired and that the X-ray projection images of said second series and the X-ray projection images of said third series are alternately at a first or second fixed projection plane, respectively, acquired from different projection directions during inflow of contrast agent into the vascular tree of the object, and an image processing device as defined above according to the present invention for generating a time series of 3D volume images showing the blood flow in a vascular tree of an object.

Preferred embodiments of the invention are defined in the dependent claims.

The invention is based on the idea to use time information about the blood flow (or contrast agent flow) in the vascular tree obtained from two different projection directions which thus also include some spatial information, and to map said time and spatial information onto a 3D volume image of the object of interest resulting in a 4D data set of voxel dependent grey value changes in the vascular tree. This makes it possible to display temporal and spatial grey value changes within an aneurysm which is not possible with known flow reconstruction methods.

According to the present invention this is obtained by use of a 3D volume image of the object which is reconstructed from a first series of X-ray projections images and from which the vessel tree is segmented. Furthermore, a second and third series of X-ray projection images, which have been alternately acquired, i.e. in interleaved acquisition mode, from different projection directions, i.e. at different projection planes, is used. Onto said projection planes the segmented vessel tree is forward projected so that the projected position of each of the segmented voxels in the projection planes is known.

For each pixel in the projection planes a grey value time curve now exists from the time series (second and third series) of X-ray projection images showing the inflow, duration and outflow of contrast agent projected onto this pixel. Finally, the image values (grey values) of the pixels of the vessel tree in the X-ray projection images of said second and third, respectively, time series are mapped onto corresponding voxels of the 3D volume images, i.e. the grey value time curve for each pixel is projected onto the corresponding voxel in the 3D volume image to obtain a time series of 3D volume images showing the blood flow in the vascular tree of the object, i.e. to obtain a 4D volume data set.

In a preferred embodiment an image stacking method is applied resulting in a reference projection image per projection direction showing the vascular tree. An example for an image stacking method which may be used for this purpose is described in Schmitt, H. et al. "Image Stacking with Entropy Values in Angiography", Radiology 2004; 230: 294-298. The reference projection images obtained by the image stacking are preferably needed for motion compensation. If there is no patient motion, a calibration of the system geometry is generally sufficient in order to facilitate the mapping. The forward projections are then directly made onto these reference projection images lying in the first and second, respectively, projection planes.

According to a preferred embodiment a motion compensation unit is provided for compensation of motion of the object between the acquisition of the first series of X-ray projection images and the second and third series of X-ray projection images. Such a motion compensation is preferably applied after the segmented vessel tree has been forward projected onto the reference projection images to achieve full and accurate correspondence between the reference projection images and the forward projections. Alternatively, it is proposed to provide a registration unit for registration of the forward projected images of the 3D volume image onto the reference projection images. It is, for instance, not necessarily required that the first series of X-ray projection images is directly applied before the second and third series of X-ray projection images are acquired, but it may also be possible that said first series is acquired on another day or some time in advance before the second and third series are acquired. The registration is then required since the patient's position has been changed in the meantime.

Preferably, means are generally provided for determine if any motion compensation or registration is required based on the forward projected images and the second and third series of projection images.

Rather than mapping directly the image values of pixels of the vessel tree in the projection images of the second and third series onto corresponding voxels of the 3D volume image, it is proposed in a further embodiment to determine mean image values of neighboring projection images of the second and third series, i.e. a mean value is formed of an image value of an image of the second series and the subsequently acquired image of the third series, both of the same voxel, and this mean value is then mapped onto the corresponding voxel. Thus, the obtained 4D volume data set shows the mean of the varying grey values from the different projection images, said 4D volume data set having a high temporal resolution.

Generally, two situations of averaging can be distinguished. In a first situation a part of the vessel tree is freely projected in both projection directions, so that the mean values of each two neighboring projection images (i.e. one from the first direction and the subsequent one from the other direction) are determined leading to a higher resolution in time. In a second situation there are overlapping parts of the vessel tree in one projection direction. Then, only a lower resolution in time (i.e. the resolution of the second or third series) can be obtained, and the mean values are determined for two neighboring projection images of the same series. For an aneurysm which is freely projected in both directions, the information from both directions can be used to achieve a higher spatial resolution within the aneurysm.

Preferably, not only during the acquisition of the second and third series of X-ray projection images a contrast agent is flowing into the vascular tree, but also during acquisition of the first series of X-ray projection images the vessel tree has been completely filled with contrast agent to improve contrast in said images.

While generally any two different projection directions are possible for obtaining said second and third series of X-ray projection images, it is advantageously proposed according to another embodiment that the two projection directions are substantially orthogonal which is often used in a bi-plane acquisition mode. This has the advantage that the overlapping of vessel structures in the projections is expected to be most efficiently reduced if orthogonal projection angles are used. Preferably, the two projection directions are selected such that, for instance in case of examination of an aneurysm, the projection directions are as orthogonal as possible and from both projection directions the aneurysm is not superposed by other vessels.

Furthermore, according to still another embodiment, not only the vessel tree may be forward projected onto the projection planes or the reference projection images, but the complete 3D volume image can be projected onto the projection planes or the reference projection images and, further, the image values of all pixels of the projection images of the second and third series can be mapped onto the corresponding voxels of the 3D volume image instead of only mapping the image values of pixels of the vessel tree. This is, for instance, of interest for applications where information can be gathered not only from the vessels tree but also from surrounding tissue (e.g. capillary vessels in the surrounding tissue) which could not be segmented. An application where this can be used is the imaging of the head and the processing of perfusion information.

The invention will now be explained in more detail with reference to the drawings in which.

Figure 1:
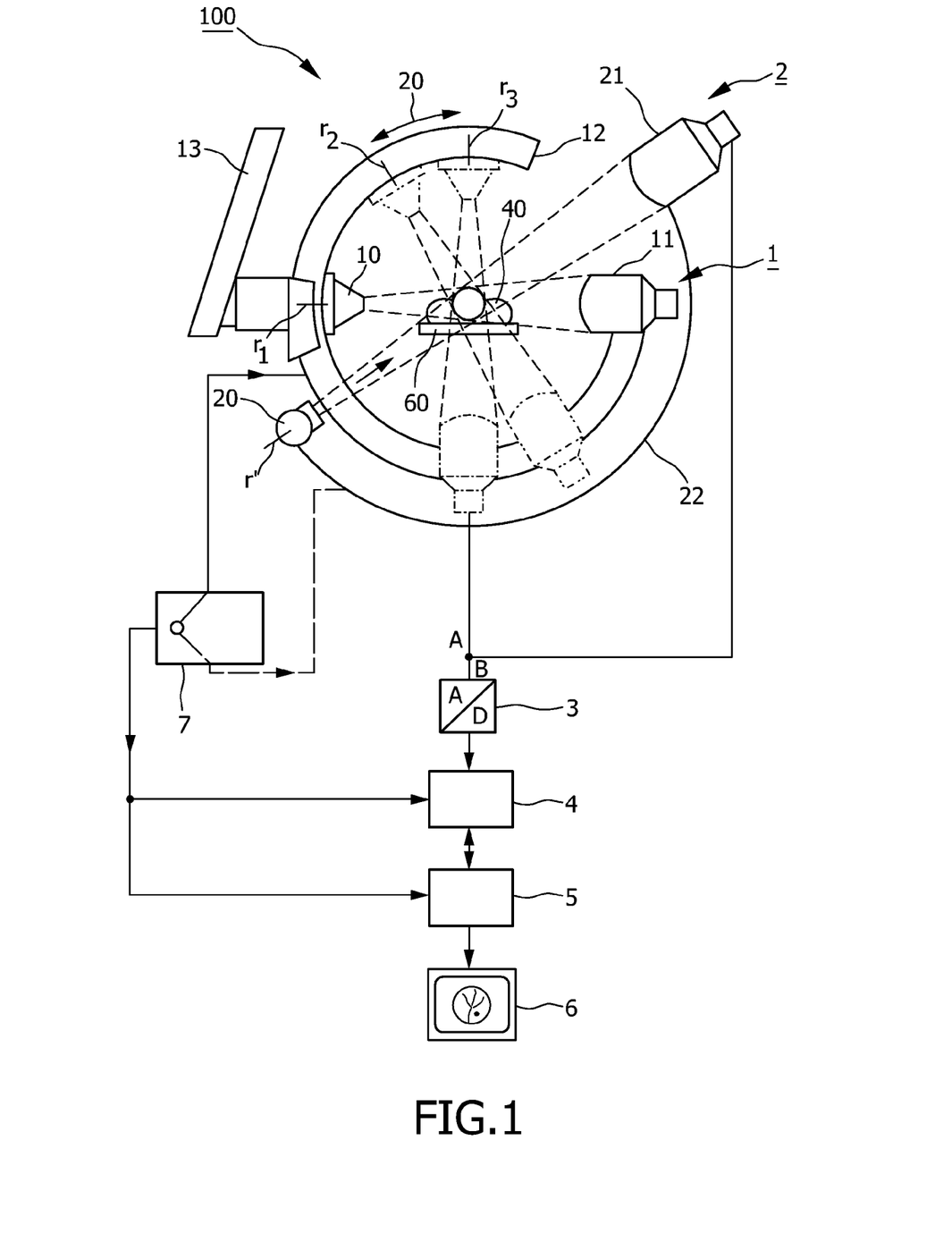
FIG. 1 shows a diagrammatic representation of an X-ray device according to the present invention.

FIG. 1 shows an X-ray device 100 according to the present invention that serves for the formation of two-dimensional X-ray images, or X-ray projection images, of an object 40 to be examined, for example, a patient who is arranged on a patient table 60. The X-ray device includes a first imaging unit 1 having a first X-ray source 10 and a first X-ray detector 11 that are mounted so as to face one another on a C-arm 12 which itself is mounted on a stand 13 that is only partly shown. The C-arm 12 on the one hand can be pivoted about a horizontal axis while on the other hand it can be rotated, by means of a motor drive, for example, through 180° about its center in the direction of the double arrow 20. This movement enables the formation of a multitude of X-ray images that represent the object 40 to be examined from different reproducible projection directions $r_1$, $r_2$, $r_3$ of the first imaging unit 1.

There are also provided a second imaging unit 2 having a second X-ray source 20 and a second X-ray detector 21 that are mounted on a mounting device 22 and are capable of forming projection images of the object 40 to be examined from a fixed (which may, alternatively, also be variable if desired or necessary) X-ray position r'.

Each of the X-ray detectors 11, 21 may be formed by an X-ray intensifier whereto there is connected a television chain whose output signals are digitized by an analog-to-digital converter 3 so as to be stored in a memory 4.

The X-ray projection images that are acquired by the first imaging unit 1 from different positions $r_1, \ldots, r_i, \ldots, r_m$ can be processed by an image processing unit 5 so as to be displayed, individually or as a series of images, on a monitor 6. The X-ray projection images that are acquired by the second imaging unit 2 from the fixed X-ray position r' at discrete instants during the inflow of a contrast medium can also be processed by the image processing unit 5 so as to be displayed on the monitor 6. The individual components of the X-ray device are controlled by means of a control unit 7.

Figure 2:
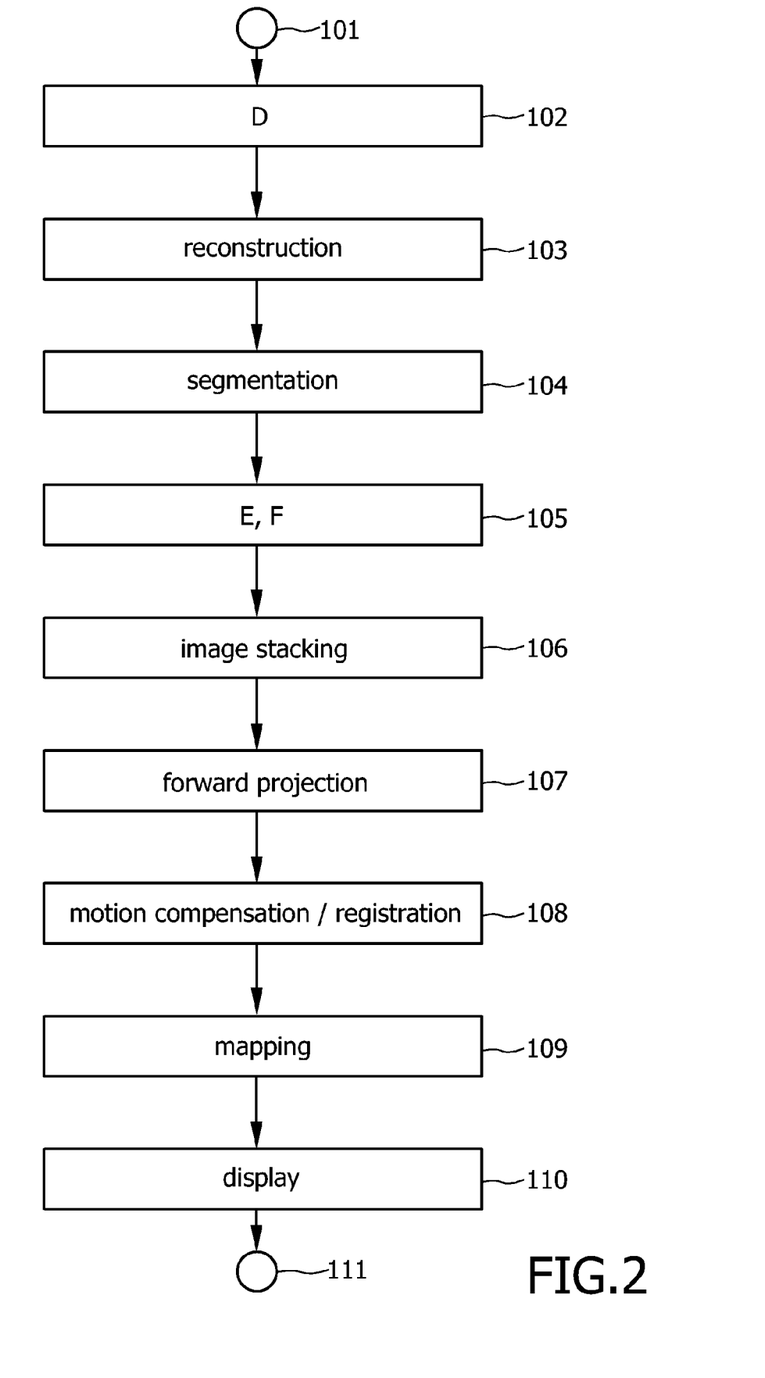
FIG. 2 shows a flow chart of the method in accordance with the invention, FIG. 3 a diagrammatic representation of an image processing device according to the present invention.
Figure 3:
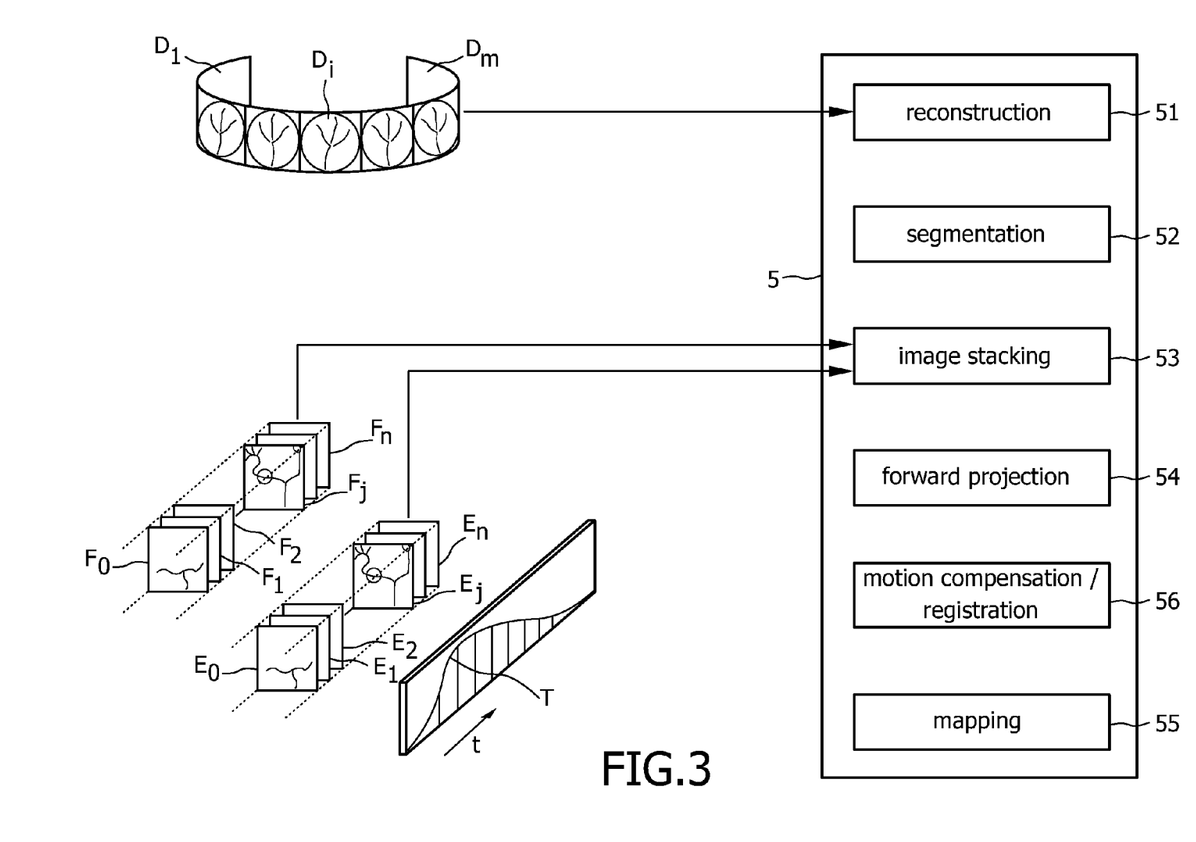

The invention will be described in detail hereinafter with reference to the flow chart shown in FIG. 2 and the block diagram of FIG. 3 showing more details of the image processing unit 5. After the initialization (step 101), a (first) series of X-ray projection images $D_1, \ldots, D_i, \ldots, D_m$ are acquired with different projection directions while the vascular tree is filled with a contrast medium (step 102) by use of the first imaging unit 1. Subsequently, in step 103 a three-dimensional volume image is reconstructed from the series of (two-dimensional) X-ray projection images D by use of a reconstruction unit 51. In this respect it is assumed that the position and the orientation of the X-ray source 10 and an X-ray detector 10 are known for each projection image (for example, on the basis of a preceding calibration measurement).

The reconstructed three-dimensional image not only shows the vascular tree (filled with contrast medium), but also other structures such as bones. Therefore, in the step 104 the three-dimensional image is segmented by use of a segmentation unit 52 in such a manner that it shows only the vascular tree while all other structures are preferably suppressed. In the simplest case such segmentation can be performed by way of a thresholding operation that assigns all voxels that have a comparatively high absorption value to the vascular tree and suppresses the reproduction of all other voxels. Use may alternatively be made of a different segmentation method (for example, a method capable of detecting line-shaped structures) that produces more accurate segmentation but usually requires more calculation effort. Generally, a binary volume results in which voxels, which belong to the vascular structure are marked, e.g. by a label value 1, while the surrounding volume is marked by e.g. label value zero.

In subsequent step 105 a high-speed bi-plane flow acquisition of the vascular tree is performed during inflow of a short additional contrast agent bolus T. These bi-plane projections are acquired from different, preferably orthogonal, projection directions in interleaved acquisition mode, i.e. the projection images of said two series of projection images $E_0, \ldots, E_j, \ldots, E_n$ and $F_0, \ldots, F_j, \ldots, F_n$ are acquired by use of said first and second imaging units 1, 2. For instance, said second series of projection images $E_0$-$E_n$ is acquired by use of the first imaging unit 1 where the first X-ray source 10 is at position $r_2$, and the third series of projection images $F_0$-$F_n$ is acquired by use of the second imaging unit 2 where the X-ray source is at position r', i.e. at a position rotated by 90° about the longitudinal access of the patient 40.

In step 106 an image stacking method is, preferably but not necessarily, applied to both projection series E, F by use of an image stacking unit 53 resulting in a reference projection image per direction (one reference projection image per series E, F) showing a complete vascular system. An entropy method which may preferably be applied for image stacking a series of angiographic images is described in the above cited article of Schmitt H. et al. Said entropy method comprises calculation of the entropy of the time course for each image pixel. This accentuates image areas where a contrast agent bolus is passing. Of course, other methods, such as a maximum opacity method also briefly described in said article.

Further image stacking methods which might be applied are described in references cited in said article.

In step 107 the segmented 3D volume, in particular the segmented vessel tree, is then forward projected to both reference projection images obtained by the previous image stacking step by a forward projection unit 54.

Motion which may have occurred between the acquisition of the first series of projection images D and the second and third series of projection images E, F is corrected in step 108 using a 2D or 3D motion compensation method in a motion compensation unit 56. For this purpose any kind of motion compensation method can be used, such as a mutual information maximizing method (c.f. E. Meijering et al., Reduction of patient motion artifacts in digital subtraction angiography: Evaluation of a fast and fully automatic technique. Radiology, 219:288-293, 2001). Alternatively, a registration method can be used to register the forward projected images with the reference projection images. For this purpose any kind of 2D registration method may be used. At this stage, the projected position of each of the segmented voxels in the projection plane is known. For each pixel in the projection plane a grey value time curve exists from the high speed data acquisition of the second and third series of projection images E, F showing the inflow of contrast agent projected onto this pixel. In case no motion has occurred, no motion compensation and no registration is generally required.

Subsequently, in step 109 and by use of a mapping unit 55, for each time frame (projection image) acquired with the high speed bi-plane projection series E, F, a corresponding grey value is projected to the voxel in the 3D volume image. In more detail, it is preferably the mean from the two neighbouring time frames (due to interleaved acquisition), which is projected to the voxel in the 3D volume image. This is shown in more detail in FIG. 4 where, over time, the contrast agent (CA) bolus T and the second and third series of projection images E, F are shown, in particular the points in time at which the single projection images of said series have been acquired. In the last diagram of FIG. 4 the mean from two neighbouring projection images are then indicated by reference signs G where, for instance, $G_{11}$ means the mean of projection images $E_1$ and $F_1$ or, in general, the reference sign $G_{xy}$ means the mean from the projection images $E_x$ and $F_y$.

Figure 4:
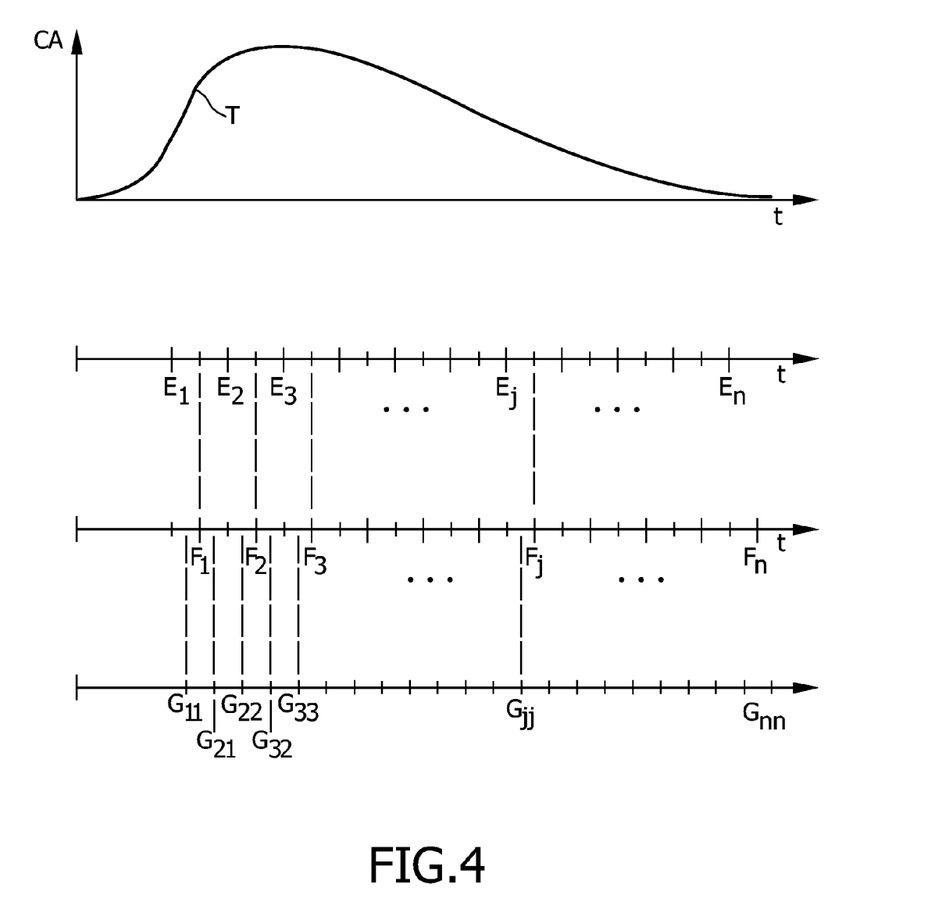
FIG. 4 illustrates the acquisition of the second and third series of X-ray projection images over time and FIG. 5 shows a diagram illustrating the steps of forward projection and mapping.
Figure 5:
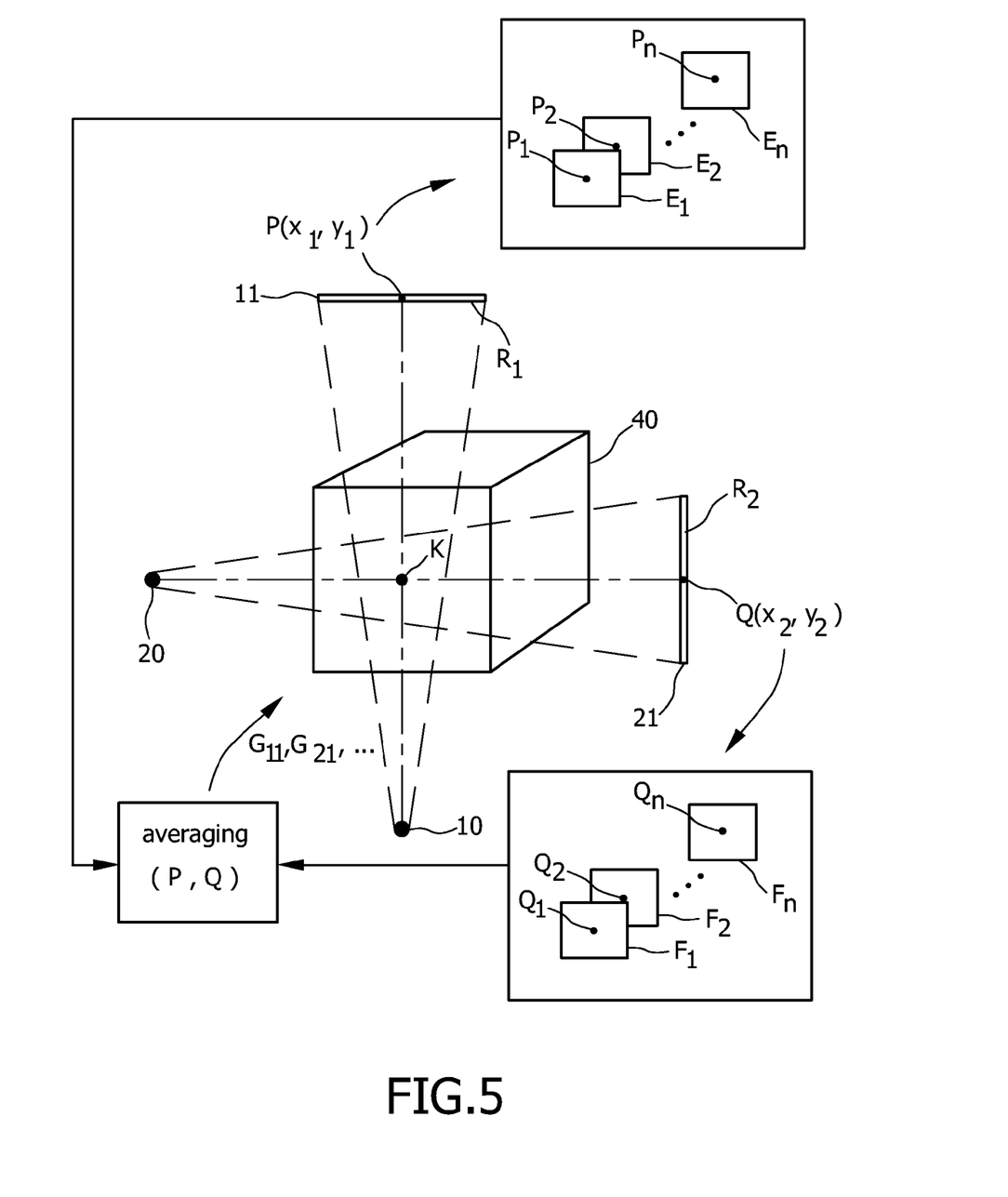

The steps of forward projection and mapping are also illustrated in the diagram of FIG. 5. There is shown, in abstract form, the object 40 to be examined from which a particular voxel K shall be considered in more detail. Further shown are the first and second X-ray sources 10, 20 and the corresponding X-ray detectors 11, 21 in positions for acquiring the second and third series of projection images according to a bi-plane mode. The positions of the X-ray detectors 11, 21 also indicate the position of the of the first and second, respectively, projection planes $R_1$, $R_2$ at which the reference projection images have been obtained by the image stacking step. In these projection planes $R_1$, $R_2$ and thus in the reference projection images the voxel K corresponds to pixels $P(x_1, y_1)$ and $Q(x_2, y_2)$, respectively. For these pixels P, Q a grey value time curve exists in the series of X-ray projection images E, F, i.e. in the series $E_1$-$E_n$ the pixels $P_1$-$P_n$ corresponding to pixel P are identified and their pixel values are assigned as a time series to pixel P. The same is done with pixel Q for which the corresponding pixels $Q_1$-$Q_n$ are identified in the series $F_1$-$F_n$ and for which the corresponding pixel values are assigned as time series to pixel Q. For these time series of the pixel values for the pixels P, Q the mean values of neighbouring (in time) pixel values are determined as shown in FIG. 4, and the mean values are then mapped onto the corresponding voxel K.

Thus, a 4D volume data set results which shows the mean of the varying grey values from the different projection directions. Due to the high-speed temporal series, time information is added to the 3D volume data set while due to the interpolation of different projection directions spatial information is added. As suggested for known flow reconstruction methods, it is feasible to apply a linear programming based optimisation scheme to correct for noise in the temporal grey value changes in 3D due to neighbouring relations of the voxels. Finally, it is possible to display (step 109) temporal and spatial grey value changes within an aneurysm by use of the method according to the present invention. As a result, a 4D data set of the voxel dependent grey value changes within a vessel tree and, in particular, within structures of the vessel tree which are non-tubular, such as aneurysms, results. Finally, in step 111, the method is terminated.

Preferably, as an addition, a priori knowledge about the wash-in of contrast agent can be applied to some extent to resolve projection ambiguities. It is known that the arriving contrast agent bolus must create an intensity change in both projection views for a given voxel. Thus, it can be concluded that an intensity change in only one view is caused by the contrast agent arriving at a voxel which is overlapping with a given one in the projection environment.

The present invention is preferably applied in high spatial and temporal resolution flat panel bi-plane C arm systems, in particular for obtaining a time series of 3D volume images showing the blood flow in a vascular tree of an object, in particular in non-tubular structures of the vessel tree. However, other applications are feasible as well, such as the mapping of perfusion information. It shall be understood that the above explained embodiment does not limit the scope of projection, but is an example for explaining the main idea of the invention. A multitude of variations are possible. For instance, the first series of X-ray projection images might be taken well in advance before that second and third series of projection images are acquired. Furthermore, other equipment for acquiring the X-ray projection images can be used, in particular for the first series, which may acquired by a CT system as well.

The invention claimed is:

1. An image processing device (5) for generating a time series of 3D volume images showing blood flow in a vascular tree of an object (40), based on a first series of X-ray projection images (D) of the object acquired from different projection directions and a second and a third series of X-ray projections images (E, F) of the object acquired alternately at a first or second fixed projection plane, respectively, during inflow of contrast agent into the vascular tree of the object, said device comprising:
   a reconstruction unit (51) for reconstruction of a 3D volume image of said object from said first series of X-ray projection images (D),
   a segmentation unit (52) for segmentation of the vascular tree from said 3D volume image,
   a forward projection unit (54) for forward projection of the segmented vascular tree onto said first and second projection plane ($R_1$, $R_2$), respectively, and
   a mapping unit (55) for mapping of the image values of pixels of the vascular tree in said second and third, respectively, series of X-ray projection images onto corresponding voxels of said 3D volume image to obtain said time series of 3D volume images showing the blood flow in the vascular tree of the object.

2. Image processing device as claimed in claim 1, further comprising an image stacking unit (53) for stacking of said second and third, respectively, series of X-ray projection images (E, F) to obtain a reference projection image for each of said first and second fixed projection direction at said first and second projection planes ($R_1$, $R_2$), and
   wherein said forward projection unit (54) is adapted for forward projection of the segmented vascular tree onto said reference projection images.

3. Image processing device as claimed in claim 2, further comprising a motion compensation unit (56) for compensation of motion of the object between the acquisition of the first series of X-ray projection images and the second and third series of X-ray projection images.

4. Image processing device as claimed in claim 2, further comprising a registration unit (56) for registration of said forward projected images of said 3D volume image onto said reference projection images.

5. Image processing device as claimed in claim 1, wherein said mapping unit (55) is adapted for forming, for the pixels of the projection images of the second and third series to be mapped onto corresponding voxels of the 3D volume image, the mean image value of two image values of subsequently acquired X-ray projection images (E, F) from said second and third series and for mapping said mean image values onto the corresponding voxels of the 3D volume image.

6. Image processing device as claimed in claim 1, wherein said first series of X-ray projection images (D) has been acquired while the vascular tree has been filled with contrast agent.

7. Image processing device as claimed in claim 1, wherein said second series of X-ray projection images (E) has been acquired from a projection direction substantially orthogonal to the projection direction from which the third series of X-ray projection images (F) has been acquired.

8. Image processing device as claimed in claim 1, wherein said forward projection unit (54) is adapted for forward projection of all voxels of the 3D volume image onto said first and projection plane ($R_1$, $R_2$), respectively, and said mapping unit (55) is adapted for mapping of the image values of all pixels of the X-ray projection images in said second and third, respectively, series onto the corresponding voxels of said 3D volume image.

9. An X-ray device for imaging the blood flow in a vascular tree of an object including:
   a first imaging unit (1) having a first X-ray source (10) and a first X-ray detector (11) for acquisition of a first series of X-ray projection images (D) of the object from different projection directions and for acquisition of a second series of X-ray projections images (E) of the object from a first fixed projection direction,
   a second imaging unit (2) having a second X-ray source (20) and a second X-ray detector (21) for acquisition of a third series of X-ray projections images (F) of the object from a second fixed projection direction,
   a control unit (7) for controlling said first and second imaging units (1, 2) such that said first series of X-ray projection images (D) is acquired before or after the second and third series of X-ray projection images (E, F) are acquired and that the X-ray projection images (E) of said second series and the X-ray projection images (F) of said third series are alternately acquired at a first or second fixed projection plane, respectively, from different projection directions during inflow of contrast agent into the vascular tree of the object, and an image processing device (5) as claimed in claim 1 for generating a time series of 3D volume images showing the blood flow in a vascular tree of an object.

10. X-ray device as claimed in claim 9, wherein said first and second imaging unit are a bi-plane imaging unit.

11. An image processing method for generating a time series of 3D volume images showing blood flow in a vascular tree of an object, based on a first series of X-ray projection images (D) of the object acquired from different projection directions and a second and a third series of X-ray projections images (E, F) of the object acquired alternately at a first or second fixed projection plane, respectively, from a first or second fixed projection direction, respectively, during inflow of contrast agent into the vascular tree of the object, said method comprising the steps of:

reconstructing a 3D volume image of said object from said first series of X-ray projection images (D), segmenting the vascular tree from said 3D volume image, forward projecting of the segmented vascular tree onto said first and second projection plane ($R_1$, $R_2$), respectively, and mapping of the image values of pixels of the vascular tree in said second and third, respectively, series of X-ray projection images onto corresponding voxels of said 3D volume image to obtain said time series of 3D volume images showing the blood flow in the vascular tree of the object.

12. A computer readable medium comprising computer executable instructions means for causing a computer to perform the steps of the method as claimed in claim 11.

* * * * *